United States Patent
Stimpfl et al.

(10) Patent No.: US 7,179,009 B2
(45) Date of Patent: Feb. 20, 2007

(54) CONNECTION BETWEEN A STEERING MECHANISM AND A STEERING COLUMN OF A MOTOR VEHICLE STEERING SYSTEM

(75) Inventors: Markus Stimpfl, Graz (AT); Erwin Koller, Leibnitz (AT); Wolfgang Bräutigam, Sottrum (DE)

(73) Assignee: Magna Steyr Powertrain AG & Co KG, Austria (DE)

( * ) Notice: Subject to any disclaimer, the term of this patent is extended or adjusted under 35 U.S.C. 154(b) by 116 days.

(21) Appl. No.: 10/733,540

(22) Filed: Dec. 11, 2003

(65) Prior Publication Data
US 2004/0185942 A1  Sep. 23, 2004

(30) Foreign Application Priority Data
Dec. 12, 2002  (DE) ................ 102 58 028

(51) Int. Cl.
*F16D 3/00*  (2006.01)
(52) U.S. Cl. .......................... 403/57; 403/53
(58) Field of Classification Search ........... 403/289, 403/290, 375, 13, 14, 24, 331; 280/779; 464/139, 182
See application file for complete search history.

(56) References Cited

U.S. PATENT DOCUMENTS 4,628,758 A * 12/1986 Yuzuriha et al. ......... 403/359.5
5,059,053 A * 10/1991 Rose ........................ 403/290
5,090,833 A *  2/1992 Oertle et al. ............... 403/12
5,580,184 A * 12/1996 Riccitelli .................. 403/290
5,628,578 A *  5/1997 McClanahan et al. ...... 403/290
5,651,634 A *  7/1997 Kraus ...................... 403/331
6,032,349 A *  3/2000 Wagner et al. ............ 403/331
6,135,667 A * 10/2000 Debisschop ............... 403/290
6,279,953 B1 *  8/2001 Cartwright ................ 280/779
6,565,446 B2 *  5/2003 Oka et al. ................. 403/290
6,739,790 B1 *  5/2004 Crudele .................... 403/290

FOREIGN PATENT DOCUMENTS

JP        406191424 A  *  7/1994  .......... 280/779
JP       2000-320562 A  * 11/2000

* cited by examiner

Primary Examiner—Katherine Mitchell
Assistant Examiner—Ruth C. Rodriguez
(74) Attorney, Agent, or Firm—Harness, Dickey & Pierce, P.L.C.

(57) ABSTRACT

The invention relates to a connection between a steering mechanism and a steering column (1) of a motor vehicle steering system. The connection comprises a steering coupling (2) which connects these two components, is attached by one end (3) to the steering mechanism or to the steering column (1) and, at the other end (4), bears a coupling piece (5) in an articulated manner. The latter forms a connecting partner with the other component (1) in each case and has two clamping jaws (6, 7) which, after the coupling piece (5) has been pivoted around the axis of articulation (8), engage around a section (9) of the other component (1).

7 Claims, 2 Drawing Sheets

CONNECTION BETWEEN A STEERING MECHANISM AND A STEERING COLUMN OF A MOTOR VEHICLE STEERING SYSTEM

BACKGROUND OF THE INVENTION

The invention relates to a connection between a steering mechanism and a steering column of a motor vehicle steering system.

A connection according to the generic type is disclosed in EP 044 591 B1. In order to produce the connection in this case, a coupling piece which is arranged pivotably on a steering column and has two clamping jaws is pivoted via a shaft journal of a steering mechanism fixed in a motor vehicle. The coupling piece is equipped between its clamping jaws with a spring-loaded locking device, the locking bolt of which is pressed into an unlocking position by the shaft journal during the pivoting movement. After the pivoting movement has finished and therefore when the upper side of the shaft journal bears against the base of the U shape of the coupling piece, the locking bolt, which is no longer covered by the shaft journal in this position, is released, so that the locking bolt, driven by the spring force exerted on it, dips below the shaft journal and blocks the latter in relation to the coupling piece possibly pivoting back and in relation to the associated release of the shaft journal. The known connection is intended to make single-handed installation possible in a simple manner with the possibility of producing the connection without looking at it, which would considerably facilitate the installation. Furthermore, the shaft journal has a tapering on its lower side which is intended to provide a mechanical securing means in conjunction with the clamping screw. The locking bolt is, moreover, of hollow design and is arranged in such a manner that, when the clamping screw is inserted through the holes in the clamping jaws, it penetrates the locking bolt coaxially. In the connecting position, the bolt and screw are situated with one section in the tapering of the lower side of the shaft journal. However, in the known device, the steering column and coupling element have to be exactly aligned with each other axially, since otherwise the locking bolt and the clamping screw come to lie next to the tapering and, as a result, firstly the locking bolt loses its locking function and, secondly, the clamping screw cannot be placed through the holes. This requires an increased effort in terms of adjustment which can only be carried out with both hands.

The invention is based on the object of developing a connection of the generic type to the effect that it can be produced in a simple manner with the connecting partners aligned axially.

SUMMARY OF THE INVENTION

The object is achieved according to the invention by providing a connection between a steering mechanism and a steering column of a motor vehicle steering system, having a steering coupling which connects these two components, is attached by one end to one of the two components and, at the other end, bears a coupling piece in an articulated manner, said coupling piece forming a connecting partner with the other component in each case and having two clamping jaws which, after the coupling piece has been pivoted about the axis of articulation, engage around a section of the other component, and having a clamping screw which is inserted into two openings formed in the clamping jaws and aligned with each other, and is screwed into a thread in such a manner that the section which is engaged around is secured by the clamping jaws, wherein at least one bolt is arranged on the coupling piece or on its connecting partner, to which the coupling piece is connected with clamping action, said bolt engaging, in a connecting position, in a groove of the other connecting partner in each case, the groove having an end section which, with respect to the axial extent of the connecting partner bearing said groove, runs perpendicularly in the vertical direction and in which the bolt has its end position, and wherein the groove is open in the vertical direction at the end remote from the end position.

Owing to the design of a bolt, on the one hand, and of a groove, on the other hand, on the connecting partners of coupling piece and steering column or steering mechanism, and owing to the special configuration of the groove profile, the connecting partners are moved, during the pivoting of the coupling piece after the bolt has engaged in the groove, relative to each other in a restricted guide means and are automatically aligned axially to each other. A prerequisite is, of course, that one of the two connecting partners can be adjusted axially, so that it can be aligned on account of being able to move axially. Furthermore, the entry opening of the groove has to be large enough in order to be able to easily accommodate the bolt even if there are relatively large axial deviations from the desired relative connecting position of the connecting partners. By means of the profile according to the invention of the end section of the groove, the bolt obtains an axially immovable support on the other connecting partner, which is designed with the groove. It is therefore possible with the invention to carry out the installation without particular effort and rapidly with one hand, even in the case of small structural spaces and poor accessibility for manual installation, since the correct relative position of the connecting partners in the connecting position is always obtained by virtue of the automatic alignment. This enables the clamping screw to be screwed into the thread through the opposite openings in clamping jaws of the coupling part without impediment. Incorrect rotational positions of the steering column or coupling pieces which have not been opened out correctly are immediately recognized owing to the special geometry of the groove, which means that incorrect installations can be prevented from the outset.

BRIEF DESCRIPTION OF THE DRAWINGS

The invention is explained in greater detail with reference to an exemplary embodiment which is illustrated in the drawings, in which.

DETAILED DESCRIPTION

Figure 1:
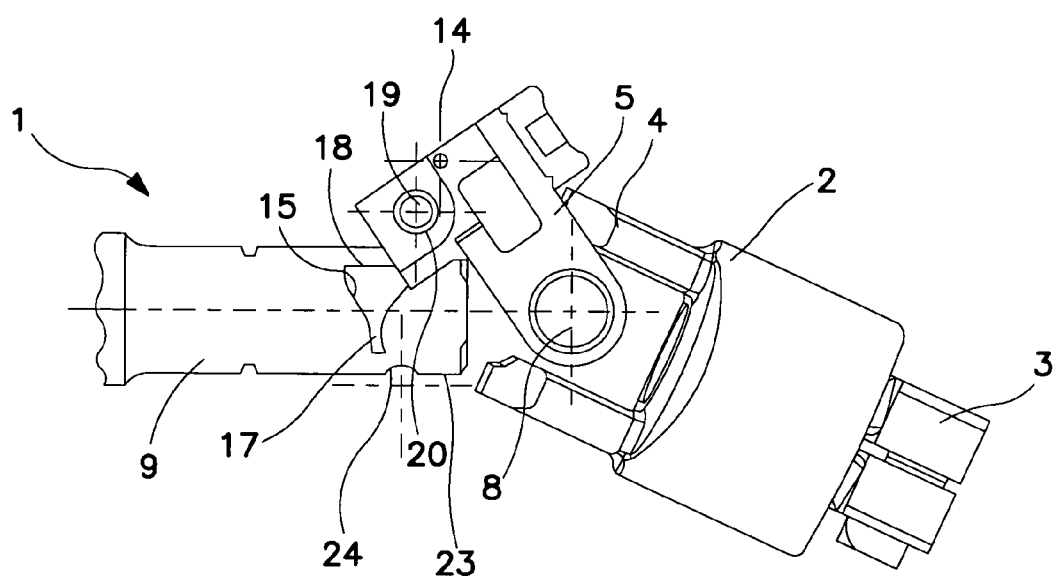
FIG. 1 shows, in a lateral view, a coupling piece of a steering coupling and a steering column journal in the installation position for producing a connection according to the invention.

FIG. 1 illustrates a connection between a steering column 1 of a motor vehicle and a steering mechanism. These two components, the steering column 1 and steering mechanism, are connected by a steering coupling 2 which is fastened at one end 3 to the steering mechanism and, at the other end 4, bears a coupling piece 5 in an articulated manner. As an alternative, it is also conceivable to fix the steering coupling 2 by the end 3 rigidly to the steering column 1, so that the connection is produced in a reverse sequence to the exemplary embodiment described. The coupling piece 5 and the component to which the steering coupling 2 is not fixed after the pre-installation process, this therefore being the steering column 1 in the first case, and to which the coupling piece 5 is to be connected, form connecting partners.

Figure 2:
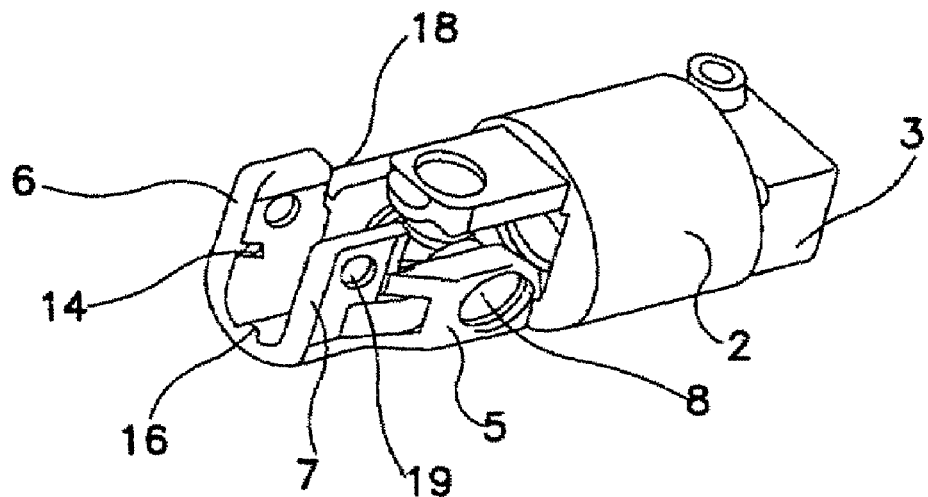
FIG. 2 shows, in a perspective view, the steering coupling from FIG. 1 with a coupling piece having clamping jaws and a bolt on the inside.
Figure 3:
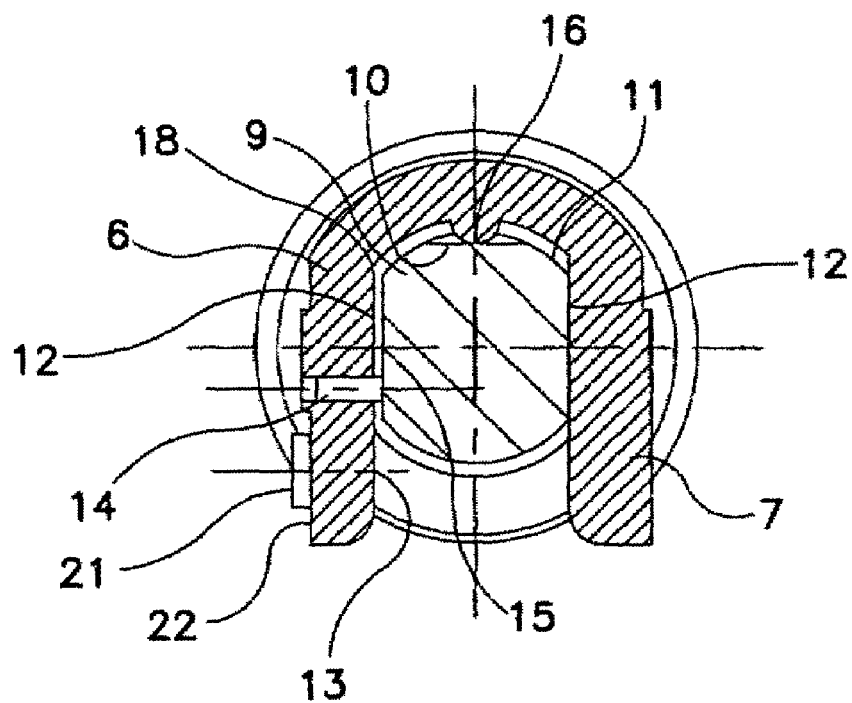
FIG. 3 shows, in cross section, a connection according to the invention with the coupling piece and the steering column journal from FIG. 1.

The coupling piece 5 has two clamping jaws 6, 7 which lie opposite each other and which, after the coupling piece 5 has been pivoted about the axis of articulation 8, engage around a section of the steering column 1 formed by a steering spindle journal 9. Although the clamping jaws 6, 7 may also be arranged in a V-shaped manner with respect to each other, in the present exemplary embodiment they are placed parallel to each other, for which purpose, in a simple manner in terms of manufacturing, the coupling piece 5 is given a U shape in cross section, for example by casting (FIGS. 2 and 3). The limbs of the U shape form the clamping jaws 6, 7 while the base 10 of the U shape bears, in the connecting position of the coupling piece 5, against the facing circumferential region 11 of that section of the steering column 1—the steering spindle journal 9—which is engaged around. In order to obtain a bearing over as large an area as possible, the sides 12 of the section 9 which is engaged around that lie opposite the clamping jaws 6, 7 are of flattened shape corresponding to the mutually parallel and vertically extending shape of the clamping jaws 6, 7, so that the subsequent clamping ensures that the section 9 and the coupling piece 5 are supported particularly well on each other.

A bolt 14 is arranged on the inside 13 of the clamping jaw 6, said bolt protruding vertically on the latter and pointing toward the other clamping jaw 7. A groove 15 is formed on the flattened side 12 of the section 9 and has an end section 17 which, with respect to the axial extent of the section 9, runs perpendicularly in the vertical direction. At the other end 18, the groove 15 is open in the vertical direction. When the coupling piece 5 is pivoted, the bolt 14 engages in the groove 15 and runs into the latter until a bead 16, which protrudes on the base 10 of the coupling piece 5 and serves as a stop, bears, in the connecting position finally adopted, against the upper side of the steering spindle journal 9 (FIG. 3). The groove 15 may also be arranged on the inside 13 of the clamping jaws 6, 7 and the bolt 14 may be arranged on the flattened sides 12 of the section 9. It is similarly conceivable to provide both clamping jaws 6, 7 with opposite bolts 14 and both sides 12 of the section 9 with opposite grooves 15 running in parallel, which facilitates the axial alignment of the section 9 and of the coupling piece 5 with each other owing to the reduction in the risk of tilting which is achieved in this case. Furthermore, both the coupling piece 5 and the section 9 may be alternately formed in each case with a groove 15 and with a bolt 14—in each case arranged in a matching position to each other.

In order furthermore to prevent the bolt 14 from tilting when inserting it into the groove 15 and in order to facilitate the axial alignment, the groove 15 is designed in the shape of a circular arc, the associated, imaginary circle being at least virtually concentric with the imaginary circle of the pivoting movement. In this case, the vertical end section 17 of the groove 15 can form the end of the circular arc. The groove 15 widens in a funnel-shaped manner from the end section 17 toward the end 18, this improving the threading of the bolt 14 into the groove 15 when the coupling piece 5 is pivoted inward, and also enabling the bolt 14 to be received in the groove 15 even if there are relatively large axial deviations from the optimum relative position between the steering column 1 and steering coupling 2, and therefore ensuring that the two components are aligned exactly. In order for the bolt 14 to be threaded into the groove 15 in a manner which is as friction-free and wear-free as possible, the bolt 14 can be mounted rotatably on the clamping jaw 6 in the manner of a roller, so that the bolt 14 virtually rolls into the groove 15.

After the end position of the bolt 14 has been reached when the bead 16 bears against the upper side of the steering spindle journal 9, for which only one hand is required when pivoting the coupling piece 5, the coupling piece 5 is finally fixed on the section 9 by means of a clamping screw. The latter is inserted in a simple manner, likewise using one hand, into two openings 19 formed in the clamping jaws 6, 7 and aligned with each other, and is screwed into a thread 20 in such a manner that the section 9 which is engaged around is secured by the clamping jaws 6, 7. The thread 20 can be cut directly into the opening 19 of the clamping jaw 6 remote from the screw head. However, in a simple manner in terms of manufacturing, the thread 20 is formed in a weld-on nut 21 (FIG. 3) which is fastened, preferably welded, to the outside 22 of the clamping jaw 6 of the coupling piece 5. The section 9 which is engaged around has, on its lower side 23, a transverse channel 24 of a semicircular cross section (FIG. 1) against which the clamping screw, which extends below the section 9, bears to mechanically secure it. In this position, the clamping screw has the greatest clamping force on the section 9. If the bolt 14 has reached its end position in the groove 15, then the openings 19 of the clamping jaws 6, 7 are centered with the central axis of the transverse channel 24, so that the clamping screw can be inserted without obstruction through the openings 19. As an alternative to the transverse channel 24, a screw passage hole which runs transversely can be provided in the section 9 which is engaged around, as a result of which the clamping screw is given particularly good support and particularly good guidance when passing it through the openings 19 and screwing it into the thread 20.

Two variants are conceivable for positioning the bead-shaped stop 16 and the opening of the groove 15. Firstly, as shown in this exemplary embodiment, the stop 16 can act upon the upper side of the steering spindle journal 9, in which case the base 10 of the U shape of the coupling piece 5 lies at the top on account of its upside down arrangement. This enables the coupling piece 5 to undergo a pivoting movement which is guided from above onto the steering spindle journal 9. In this case, the coupling piece 5 advantageously readily remains lying on the steering spindle journal 9, so that the clamping screw can be screwed in by the fitter without him having to manually hold the journal 9 and/or the coupling piece.

In a second variant, the stop 16 may, however, also be arranged in such a manner that it comes to bear against the lower side 23 of the journal 9. For this purpose, the coupling piece 5 firstly has to point upward with the opening of the U shape, so that the base 10 is situated at the bottom. Secondly, the shape of the groove 15 should be rotated through 180° about the horizontal on the steering spindle journal 9, so that its funnel-shaped introductory opening is situated at the bottom. This enables the coupling piece 5 to be pivoted from below onto the steering spindle journal 9. Since the coupling piece 5 is pivotable, it may, however, be pivoted out of its connecting position again due to gravitational force—if the fitter lets go of it in order to fit the clamping screw. In order to prevent this, a locking device may be arranged in the vicinity of the end position of the bolt 14 on the groove 15, said locking device blocking the groove 15, when the stop 16 bears against the lower side 23 of the journal 9, in such a manner that the bolt 14 is held by the locking device. A slide which is supported by a compression spring, is arranged in a guide groove which runs transversely to the end section 17 of the groove 15 and leads into the latter, and projects into the groove 15 because of the compression spring, is one example of how the locking device can be designed. That end side of the slide which projects into the groove 15 is beveled in such a manner that the bolt 14, before it reaches the end position, can push the slide back into the guide groove. In the end position of the bolt 14, the slide is no longer pressurized on account of being arranged at a distance from the end position of the bolt 14, and so it is pushed behind the bolt 14 into the groove 15, the bolt then bearing against the outside of the slide and, owing to the absence of a suitable slope on the slide, not being able, from its end position, to automatically open the slide.

As an alternative to the locking device, a latching device may also be arranged in the vicinity of the end position of the bolt 14, which, when it reaches the end position, latches into it. The latching device may be brought about, for example, by the fact that the groove 15 has, in the vicinity of the end position, an inwardly protruding bead or knob and that a slot is formed behind the region of this bead or knob in the steering spindle journal 9, the slot extending beyond the region of the bead or knob parallel to the groove 15, with the slot being spaced apart from the bead or knob in such a manner that the groove wall is elastically compliant and can therefore ensure the latching properties. As an alternative, a latching element may also be embedded into the groove 15, said latching element having a crimp which protrudes into the groove 15 and can be compressed by the bolt 14 during the pivoting movement of the coupling piece 5. The latching device has the advantage that the connection between the coupling piece 5 and steering spindle journal 9 in this prefixed position can be released again using one hand by means of simple pulling, if this should be required.

The invention claimed is:

1. A connection between two components comprising a steering mechanism component and a steering column component of a motor vehicle steering system, the connection comprising a steering coupling which connects these two components, the steering coupling has one end attached to one of the components and, another end having a coupling piece movable in an articulated manner about an axis of articulation, said coupling piece forming a connecting partner with the other component and comprises two clamping jaws which, after the coupling piece has been pivoted about the axis of articulation, engage around a section of the other component, a clamping screw inserted into two aligned openings formed in the clamping jaws, the screw is screwed into a thread in such a manner that the section which is engaged is secured by the clamping jaws, wherein at least one bolt (14) is arranged on one of the coupling piece (5) and the connecting partner (1), to which the coupling piece (5) is connected with clamping action, said bolt engages, in a connecting position, in a groove (15) of the other of connecting partner (1) and coupling piece, the groove (15) having an end section (17) which, with respect to an axial extent of the connecting partner (1) or coupling piece bearing said groove, runs perpendicularly in a vertical direction, wherein the bolt (14) has an end position, and wherein the groove (15) is open in the vertical direction at an end (18) remote from the end position, wherein the groove (15) widens in a funnel-shaped manner following the end section (17) toward the end (18) remote from the end position wherein the bolt (14) is mounted rotatably in the manner of a roller on the associated connecting partner (1, 5).

2. The connection as claimed in claim 1, wherein the groove (15) is in the shape of a circular arc, the associated, imaginary circle being at least approximately concentric with the imaginary circle of pivoting movement of the coupling piece (5).

3. The connection as claimed in claim 1, wherein on at least one of the connecting partners (1, 5), two parallel grooves (15) are arranged on opposite sides (12) of the connecting partner (1, 5).

4. The connection as claimed in claim 1, wherein the thread (20) is formed in a weld-on nut (21) which is fastened to the outside (22) of one clamping jaw (6) of the clamping piece (5).

5. The connection as claimed in claim 1, wherein that section (9) of the connecting partner (1) which is engaged around has, on its lower side (23), a transverse channel (24) having a semicircular cross section.

6. The connection as claimed in claim 1, wherein that section (9) of the connecting partner (1) which is engaged around has a screw passage hole running transversely.

7. The connection as claimed in claim 1, wherein the coupling piece (5) has a U shape in cross section, the limbs of the U shape forming the clamping jaws (6, 7) and the base of the U shape bearing, in the connecting position, against the facing circumferential region (11) of that section (9) of the connecting partner (1) which is engaged around, and wherein the sides (12) of that section of (9) of the connecting partner (1) which is engaged around that lie opposite the clamping jaws (6, 7) are flattened.

* * * * *

UNITED STATES PATENT AND TRADEMARK OFFICE
CERTIFICATE OF CORRECTION

PATENT NO. : 7,179,009 B2 Page 1 of 1
APPLICATION NO. : 10/733540
DATED : February 20, 2007
INVENTOR(S) : Markus Stimpfl et al.

It is certified that error appears in the above-identified patent and that said Letters Patent is hereby corrected as shown below:

On The Title Page, Item (73)
The Assignee "Magna Steyr Powertrain AG & Co. KG" should be --Magna Steyr Fahrzeugtechnik AG & Co. KG--.

Signed and Sealed this

Third Day of July, 2007

JON W. DUDAS
*Director of the United States Patent and Trademark Office*